United States Patent [19]
Muller et al.

[11] Patent Number: 6,082,988
[45] Date of Patent: Jul. 4, 2000

[54] SANITARY MULTIROLLER FOR WORKING DOUGH SHEETS

[76] Inventors: Bernardus Wilhelmus Muller, 160 Meadview Pl., Loveland, Ohio 45140; Udo Engelbert Bernhardt, Ringsbuhlweg 21, D-97348 Iphofen; Josef Georg Hoos, Hohenring 26, D-97348 Markt Einersheirn, both of Germany

[21] Appl. No.: 08/879,687

[22] Filed: Jun. 24, 1997

Related U.S. Application Data

[63] Continuation of application No. 08/489,780, Jun. 13, 1995, abandoned, which is a continuation of application No. 08/372,757, Jan. 13, 1995, abandoned.

[51] Int. Cl.[7] .................................................. A21C 3/02
[52] U.S. Cl. ........................ 425/363; 100/175; 426/502
[58] Field of Search ........................... 426/502; 100/175; 425/363, 367

[56] References Cited

U.S. PATENT DOCUMENTS

| | | | |
|---|---|---|---|
| 2,448,195 | 8/1948 | Schnuk | 100/175 |
| 2,494,195 | 1/1950 | Penton | 100/175 |
| 2,887,964 | 5/1959 | Griner . | |
| 3,994,215 | 11/1976 | Rabeler | 425/367 |
| 4,178,147 | 12/1979 | Hayashi | 425/363 |
| 4,266,920 | 5/1981 | Hayashi et al. | 426/502 |
| 4,880,375 | 11/1989 | Hayashi | 425/463 |
| 5,112,208 | 5/1992 | Voth | 425/363 |
| 5,295,803 | 3/1994 | Ogawa et al. | 425/367 |

FOREIGN PATENT DOCUMENTS

| | | |
|---|---|---|
| E44853 | 2/1990 | Austria . |
| 1966202 | 8/1967 | Germany . |
| 820225 | 9/1959 | United Kingdom . |

*Primary Examiner*—James P. Mackey
*Attorney, Agent, or Firm*—Handal & Morofsky

[57] ABSTRACT

A dough handling system including a bottom roller of conventional design and a satellite head is disclosed. The satellite head comprises a plurality of satellite rollers with bearing assemblies supporting the satellite rollers. The bearing assemblies are positioned outside the area defined between facing surfaces of the satellite head and the bottom roller.

7 Claims, 6 Drawing Sheets

SANITARY MULTIROLLER FOR WORKING DOUGH SHEETS

This application is a continuation of application Ser. No. 08/489,780, filed Jun. 13, 1995, now abandoned, which was a continuation of 08/372,757 filed Jan. 13, 1995, now abandoned.

TECHNICAL FIELD

The present invention relates to multiroller heads of the type which work a volume of dough by serial contact with successive circumferential rollers, particularly in the context of dough sheet lamination and/or thickness reduction in the automated manufacture of baked goods, such as frozen pizzas, croissants, pies and the like.

BACKGROUND

Unlike cakes, cookies and other baked goods of the type which rely upon chemical-based rising agents, yeast breads and pie crusts have relatively demanding dough or batter working or kneading requirements. This is because in the case of yeast-based products, the biological release of the gas which causes the dough or batter to rise does not occur over a relatively short period of time, as in the case of cakes containing sodium bicarbonate, but rather occurs over extended periods of time ranging as long as several hours (in the case of baker's yeast infused doughs) to several days (in the case of so-called salt breads which have no added yeast in their recipes but rather rely on the incorporation of yeast from the environment into the dough).

Rather than relying upon the quick release of gases, yeast breads, which typically have dough recipes consisting of flour, water, salt and baker's yeast, rely upon the development within the dough of an elastic gluten matrix. The two basic building blocks of the gluten, namely, glutenin and gliadin are naturally and separately occurring materials in wheat. When water is added to, for example, wheat flour, and the mixture is kneaded, these two components link in the presence of the water and are forced out of the grains of flour. The components thus link, in the presence of water, to form molecular chains of relatively long length. These molecular chains form an elastic mass or matrix of gluten within which remaining components of the wheat are trapped.

Classically, the gluten matrix is developed by mixing the water, flour, salt and yeast together to form a batter or dough which is then kneaded by hand. The working of the dough with the hands causes the formation of gluten. The more that the flour is worked, the more gluten is released.

However, after a certain amount of kneading, dependent upon the dough (with more working required in the case of doughs having generally higher water contents), substantially all releasable gluten will have been developed and released into the dough. In this condition, the matrix is sufficiently developed that the dough mass will recover its shape when pressed or will elastically return, to a limited extent, to its original shape when pinched and pulled. After the proper amount of kneading has been performed on the dough, the amount of additional gluten released by further kneading the dough will be insubstantial, while substantial damage to the gluten chains will start occurring. This condition is often referred to as "overkneading". Generally because of the rheology of the dough, during overkneading, damaging stresses are applied to an already sufficiently formed gluten matrix and the elasticity of the dough is damaged.

This elastic condition of the dough is exactly what allows the dough to rise prior to baking. In particular, as the yeast multiplies in the presence of water and salt, the yeast microorganisms release carbon dioxide into the elastic gluten matrix. This carbon dioxide tends to form tiny bubbles which expand and stretch the gluten matrix beyond the breaking point causing the tiniest bubbles to merge into other small bubbles which get progressively larger as merging occurs, thus forming numerous and larger bubbles.

Conversely, overkneading, whether by pressure or by pulling will both result in stretching out molecular strains into relatively straight chains. Under further stress the chains will be pulled past the breaking point, thus damaging the overall elasticity of the gluten and its ability to incorporate a great number of relatively small air chambers for containing the entrapped carbon dioxide produced by the yeast. In the most extreme case, almost all of the elasticity of the dough will be destroyed and the ability of the dough to rise will be severely compromised. The end result may be a bread of relatively dense character for the particular flour components in the recipe, or a bread incorporating large voids in some parts of its architecture and relatively small voids in other parts. This may result in part of the dough having a dough-like characteristic on account of unevenness in the cooking of the bread. Such unevenness in cooking is a direct result of the non-uniformity in the architecture of the raised unbaked dough.

Thus, overkneading or other forms of overworking the dough after sufficient gluten has been released is to be avoided. The result of such overworking goes beyond the mere aesthetics or the uniformity of the cooked product. A poor rise in the dough may make it necessary to use a greater amount of flour in order to manufacture the desired product. This means correspondingly greater costs. Thus even in situations, such as pizza manufacture, where relatively broad ranges in the quality of the risen dough may be tolerated from the standpoint of acceptable product to the consumer, e.g. dense through light "bready" crusts on through "crispy" crusts, there are still strong economic reasons for achieving a good rise in the unbaked dough.

One way of addressing this problem is to let the dough rest for a time. During the resting period, substantial repair of the gluten structure can occur. The use of a kneading followed by a first rise, followed by a second kneading and a final rise type process will also result in a repair of the dough's gluten matrix where the same has been damaged by overkneading. However such repair processes are not complete and add costs. Moreover, where knead and rise processes are properly done, the products are substantially the same as those made in double rise processes.

The other approach for obtaining a dough with good elasticity is to carefully design the dough working process to ensure that the dough is not overworked during kneading or subsequent dough forming steps such as calendaring into sheets, sheet reduction, lamination of dough layers (done, for example, in croissant manufacture), or the like. One of the general solutions to preservation of the integrity of the gluten matrix is to have repeated gentle and relatively small working steps separated by momentary periods during which the dough is allowed to return to a relatively relaxed state. After returning to the relaxed state the dough has also resumed a new more relaxed configuration for the gluten matrix and thus a repeated working will proceed from a relatively relaxed configuration. This will be less likely to cause damage to the gluten matrix. This compares to relatively deep kneading steps or, even more damaging continuous kneading or calendaring which is far more likely to stretch the gluten chains to the breaking point.

Similar problems are posed in the handling of flaky unleavened crusts as are employed in the manufacture of such products as pies and dumplings. More particularly, such flaky finished product structures depend upon localized stratifications of flattened water and flour dough strata which, under ideal circumstances, are separated and maintained as discrete elements during handling by a layer of fatty material such as oil, butter, hydrogenated oil (such as margarine), or lard.

The same is typically achieved by forming a dough of comminuted margarine, flour and water. The dough is then formed with a minimum of handling into a solid mass. Any extra handling will have the undesirable effect of working the margarine or other fatty substance into the dough and dispersing it uniformly throughout the dough, thus defeating the tendency of the discrete dough strata to form flakes after baking.

In other words, the object of the ingredient blending and dough working operation is to maintain the integrity of numerous strata which, after baking, will flake separately in the crust, thus giving the desired flaky texture to the crust. In this respect, the working of pie crust dough from a large substantially round dough mass into a dough sheet is substantially the same as that for yeast breads insofar as once the dough is formed, the stratified fat and flour strata form an architecture which should be preserved to maintain the quality of the baked goods.

Thus the object of the handling operation in pie crust dough formation is to achieve the transformation of the dough mass into a thin sheet with a minimal amount of handling and with a correspondingly minimal, and relatively minimal and predictable disruption of the architecture of the dough.

One of the most common methods of working dough is the passing of the dough between a pair of calendar rollers whose separation is adjustable to any desired gap. Typically, such calendaring is successively applied to a sheet of dough in such a manner as to result in successive reductions in the thinness of the dough sheet. Calendaring of dough has a very strong tendency to impart uniaxiality to the molecular gluten strands and thus is a particularly damaging way to work a well developed gluten matrix.

Generally, calendar reduction of the thickness of a sheet of yeast dough is achieved by a combination of pulling and pressing. Typically, dough which is to be reduced in thickness by factor of six is pulled away from a conveyer, at a speed which is quicker than the speed at which it is being fed into a pair of reducing rollers by the same factor (namely, six) as the desired reduction in thickness. In the case of yeast dough, the stretchability and resilience of the dough allows a substantial amount of leeway. However in the case of stratified unleavened margarine flour dough, care must be taken not to apply tension to the dough sheet in order to avoid the tendency of the dough sheet to break apart. Generally, the greater the reduction in thickness of the dough, the greater the damage to the gluten matrix.

One of the methods of reducing damage during calendaring, while achieving a relatively great reduction in the thinness of a dough sheet, is to use a so-called satellite roller. In this arrangement, one of the normal two calendar rollers is replaced by a satellite roller assembly comprising a pair of discs which carry between them a plurality of free-wheeling calendar rollers. Typically, anywhere between four and twelve calendar rollers may be used. These calendar rollers are mounted on posts which are secured between the discs and rotatedly mounted on the posts by bearings.

The overall roller assembly has the advantage of working the dough with one free-wheeling roller at a time and allowing it to relax. The working occurs when the free-wheeling roller makes contact with the dough and the relaxation occurs in between working by individual rollers positioned around the periphery of the assembly. Typically, the satellite roller assembly will be rotated many times for every rotation of the single calendar roll facing it and defining a gap with it.

The problem with this type of roller assembly is that the bearings, which are positioned between the facing discs, will tend to collect flour and other organic material. In addition, bearing wear and/or grease may be a factor in producing more debris, as well as rusting due to cleaning of the assembly with water. Moreover, because of the small tolerances in the gaps in the bearings and other structures associated with the satellite rollers, water tends to be wicked between facing metal surfaces by capillary action. Likewise, on account of the capillary action, the same will not drip away in time but rather will rest on the surfaces causing them to corrode and rust, thus generating additional debris and aggravating the contamination problem.

SUMMARY OF THE INVENTION

The invention, as claimed, is intended to provide a remedy. It solves the problem of how to provide a sanitary satellite roller assembly. The inventive dough handling system comprises a bottom roller of conventional design and a satellite head. The satellite head comprises a plurality of satellite rollers with bearing assemblies supporting the satellite rollers. The bearing assemblies are positioned outside the area defined between facing surfaces of the satellite head and the bottom roller.

BRIEF DESCRIPTION OF THE DRAWINGS

One way of carrying out the invention is described in detail below with reference to drawings which illustrate only several specific embodiments of the invention and in which.

DETAILED DESCRIPTION OF THE PREFERRED EMBODIMENTS

Referring to FIGS. 1–4, a conventional multiroller dough working system is illustrated. Such systems are typical of various commercially available dough working machines, such as the Fritsch Star Laminator, whose satellite head construction will allow dough layer reductions down to a proportion of ten to one with final dough sheet thicknesses in the range of three millimeters. Similar constructions are used in non-laminator type dough sheet thickness reducers. Such a prior art system 1 generally comprises a bottom roller, and a top satellite head having mounted thereon a plurality of satellite rollers 4.

Figure 1:
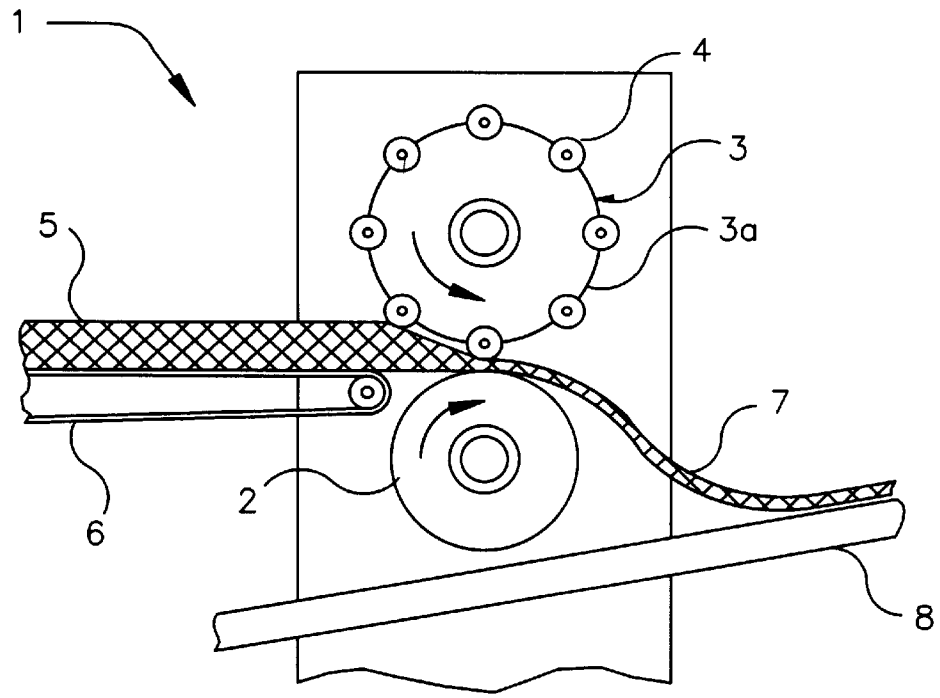
FIG. 1 is a diagrammatic representation of a prior art dough sheet thinner or laminator.
Figure 2:
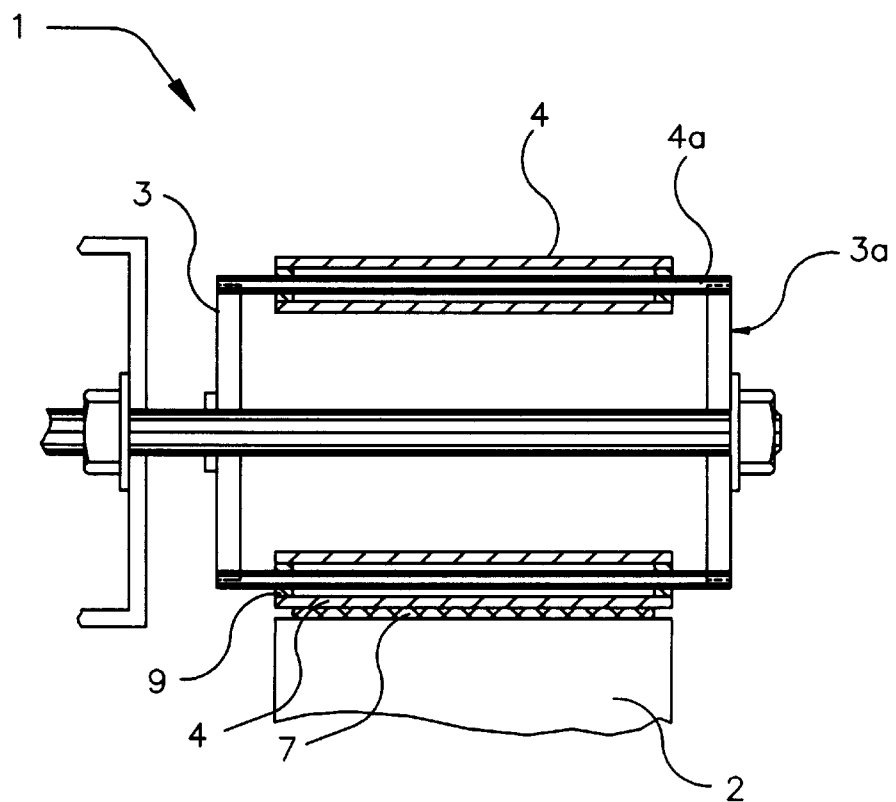
FIG. 2 is a cross sectional view along lines 2—2 of FIG. 1.
Figure 3:
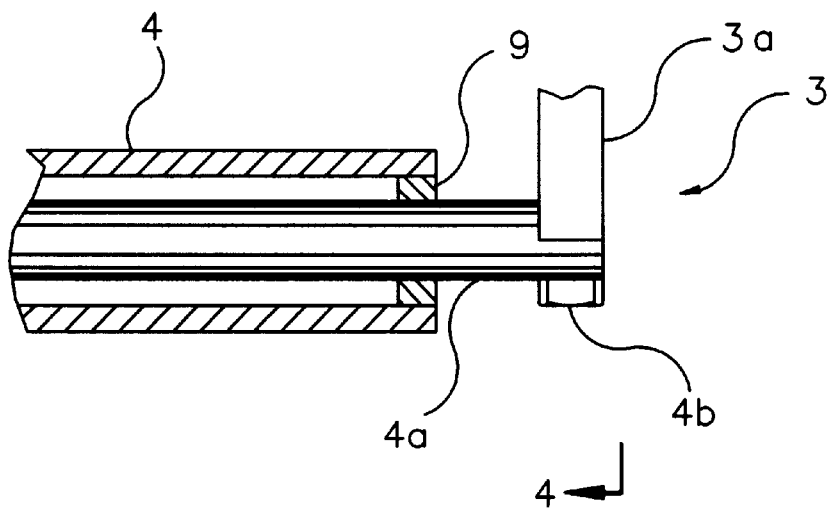
FIG. 3 is a detail of the satellite roller in the embodiment illustrated in FIG. 2.
Figure 4:
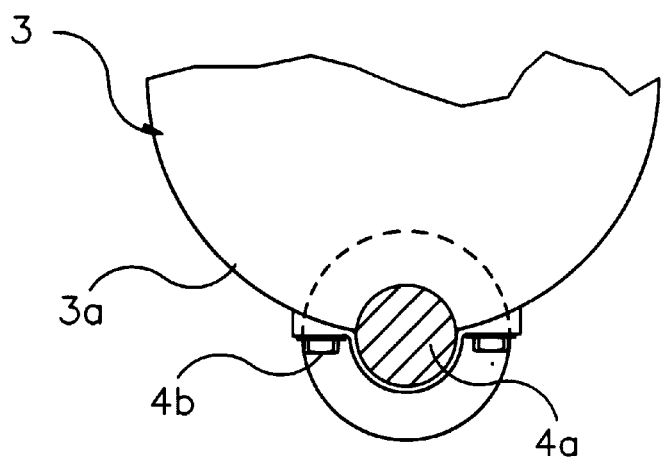
FIG. 4 is a detail along lines 4—4 of FIG. 3.

Satellite rollers 4 are freewheeling rollers mounted for rotation each by means of a pair of bearings 9, as illustrated most clearly in FIGS. 2–4. Each of the bearings is mounted on a post 4a each of which is, in turn, secured between a pair of the facing spaced support disks 3a. Typically, posts 4a are secured to disks 3a by bolts 4b.

An input sheet of dough having a relatively large thickness 5 is fed by a conveyer 6 between bottom roller 2 and satellite rollers 4. This results in reduction of the thickness of input sheet 5 to that of output sheet 7. Finally, an outfeed conveyor 8 removes the thin output sheet 7 at a rate of speed greater than the rate of speed of input conveyer 6 by a factor equal to the factor by which the thickness of the dough has been reduced.

In accordance with prior art systems, bottom roller 2 is rotated with a circumferencial speed equal to the speed of output conveyer 8. Furthermore, in accordance with the prior art, satellite head 3 is rotated at a speed which is greater than that of bottom roller 2. In particular, speeds in the range of 5 to 20 times the speed of bottom roller 2 are not unusual for satellite head 3.

The result of such greater speeds is the sequential application of pressure to the dough sheet resulting in deformation of the dough sheet to a thinner gauge, followed by a relaxation period during which the dough returns partially to its original thickness and the glutinous architecture reaches a state of relative relaxation. As soon as the next satellite roller begins to approach bottom roller 2, that satellite roller then reapplies pressure to the dough sheet again reducing it in thickness and as it leaves the dough allows the dough sheet to return partially toward its original configuration. This again allows the gluten structure to reach a relative equilibrium state for all the internal stresses induced therein.

The result of sequential applications of pressure followed by relaxation results in the successive inducement of uniaxiality in the molecular strands and limited machine direction alignment between adjacent molecular strands. By allowing the gluten matrix to return to a relatively unstressed state, the successive application of great amounts of stress in a single application is avoided and the snapping of overstretched uniaxial molecular bundles is minimized. The end result is thus a relatively gentle but effective successive reorientation of molecular alignments in the gluten to accommodate a great number of compressive stresses with the resultant thinned dough sheet having relatively long gluten strands with a substantially intact architecture. As a consequence, input dough masses can easily be reduced to thicknesses in the millimeter range while still preserving the architecture of the gluten matrix.

The problem encountered with the construction illustrated in FIGS. 1–4 is the tendency of water to accumulate on surfaces of bearing 4a. In addition, the water may become an adhesive for holding bits of dough, flour or the like thrown off by the system during operation. Thus, a substantial sanitary hazard is presented by the construction illustrated in FIGS. 1–4. Such sanitary hazard takes the form of droppings from bearings 4a. These droppings may also consist of sinters thrown off during bearing wear, such as the nickel plating of the bearings, lubrication, and impactions of the same with dough debris, ambient particulate material and so forth.

While, in principal, this problem could be eliminated by removing the bearings from the system, the result is a system which, particularly in the case of yeast-based dough, will result in relatively great friction between the dough sheet and the satellite head when the speed of rotation of the satellite head is different from that of the bottom roller. As discussed above, this is the preferred condition. Thus, such an alternative is not practical.

Figure 5:
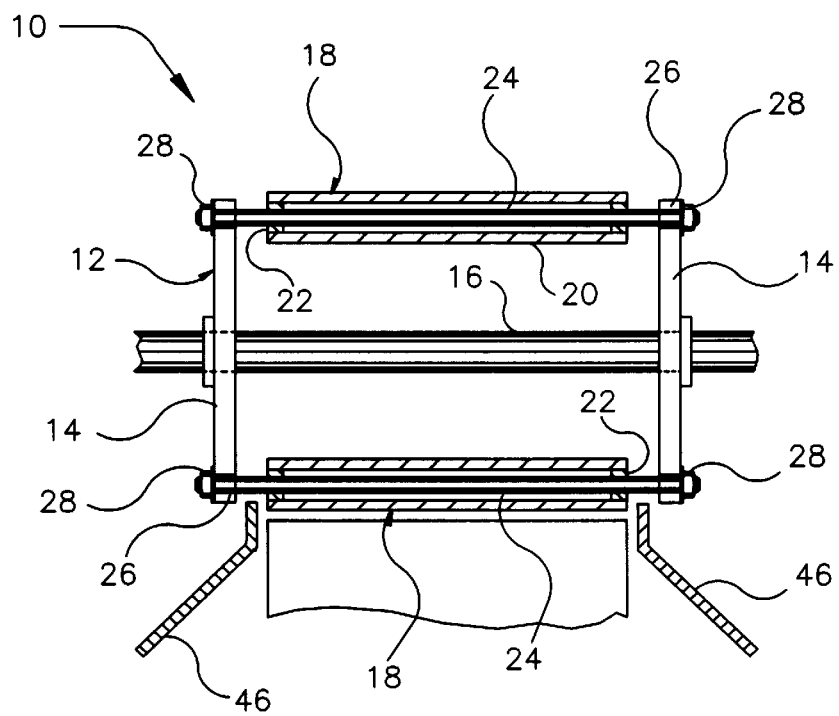
FIG. 5 is a view similar to that of FIG. 2, illustrating a system constructed in accordance with the present invention.

As illustrated in FIG. 5, in accordance with the present invention, the inventive system 10 includes a satellite head 12. Satellite head 12 comprises a pair of disks 14 mounted for rotation on a post 16 which is, in turn, driven by a motor, or other suitable drive. A plurality of satellite rollers 18 are provided. Satellite rollers 18 are rotatably mounted with respect to disks 14. In particular, satellite rollers 18 each comprise a roller 20 which is welded to annular plate 22. Annular plates 22 are in turn, welded to posts 24 which extend through slots 26 in disks 14. Posts 24 are mounted for rotation in bearing blocks 28. Bearing blocks 28 have a design which minimizes the accumulation of water in the bearings.

Figure 6:
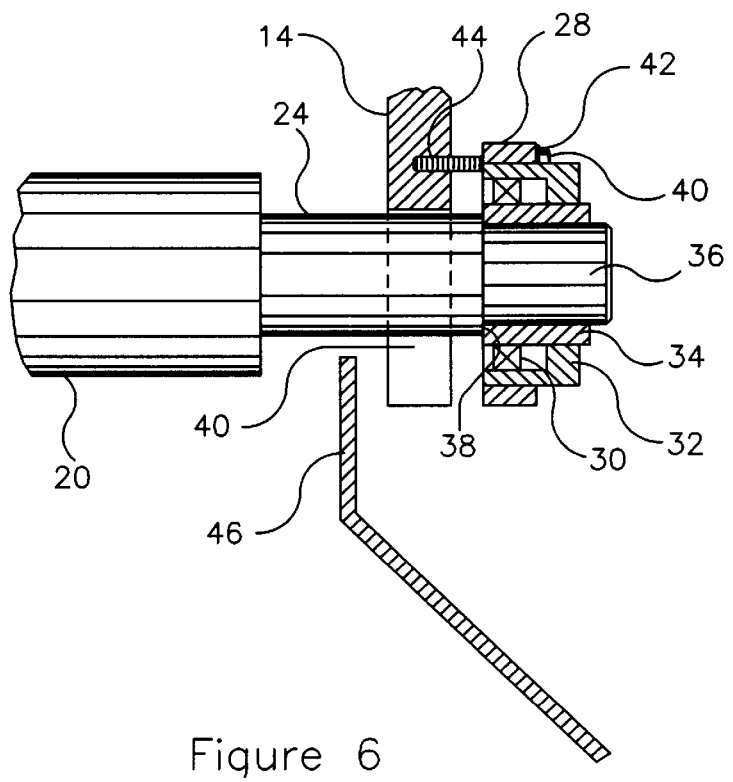
FIG. 6 is a detail of the embodiment illustrated in FIG. 5, showing the inventive bearing block configuration.

As illustrated most clearly in FIG. 6, bearing blocks 28 comprise bearings 30 and a bearing housing 32. The housing is completed by a sleeve 34 which fits around the end 36 of post 24. End 36 is formed by being machined to a smaller diameter. A shoulder 38 provided thereon acts to feed any deterioration products that result from the sliding of end 36 within sleeve 34 away from the dough under process.

In accordance with the preferred embodiment, posts 24 are held within bearing block 28, which is, in turn, secured to disks 14 by a pair of bolts 40 which are securely held in position by lock washers 42. Each of the bolts 40 threadingly engages a respective tapped hole 44 in disks 14.

In accordance with the preferred embodiment, a catch plate 46 acts as an awning to divert any falling debris from bearing block 28 away from the work area directly underneath the satellite roller 18.

Figure 7:
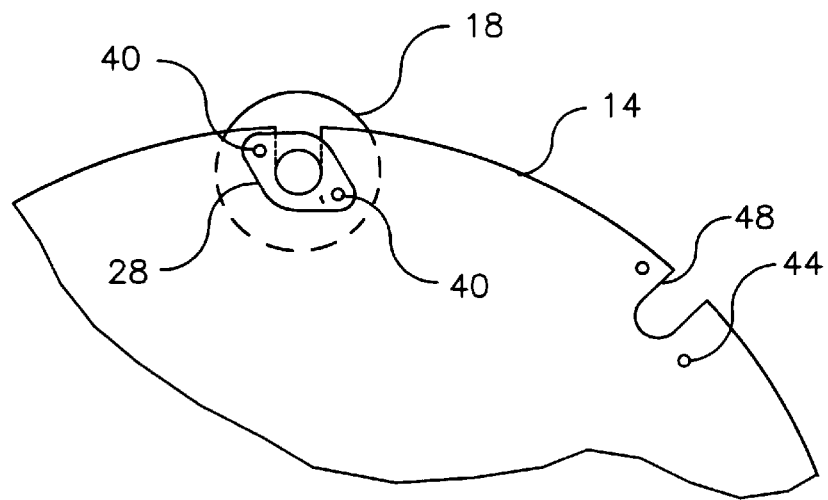
FIG. 7 is a view along lines 7—7 of FIG. 5.

In accordance with the preferred embodiment, each of the bearing blocks 28 is mounted at an angle with respect to its radial slot 48 (FIG. 7).

In accordance with the preferred embodiment, virtually all the parts of the satellite head and other parts of the system 10 are made of stainless steel, although it is acceptable to use nickel plated bearings on the system because of the protection provided by the configuration of the inventive bearing block, catch plate 46 and the location of the bearings on the outside of the disks 14.

Figure 8:
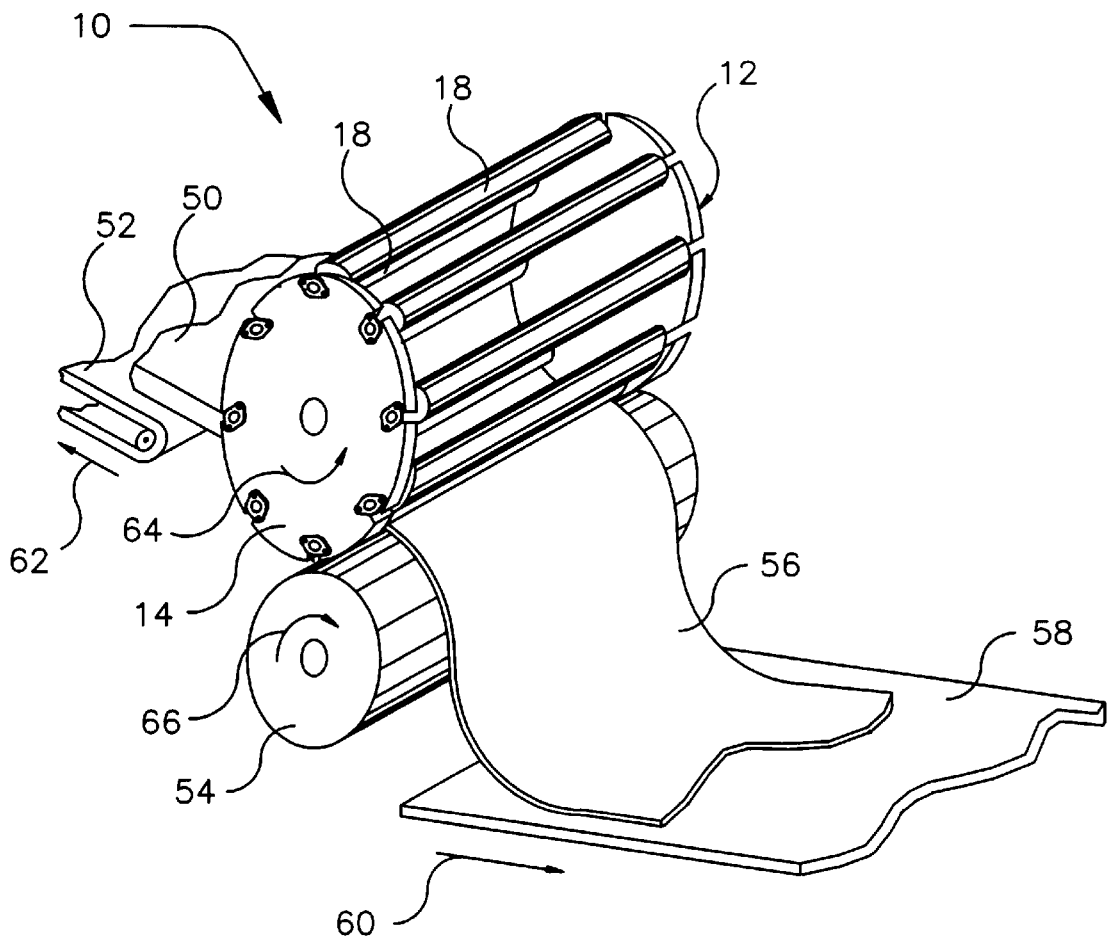
FIG. 8 is a perspective view illustrating the operation of the inventive dough reducing or laminating system.

During operation of the system, as is illustrated most clearly in FIG. 8, an input sheet of dough 50 is fed by an input feed ramp 52 between the satellite head 12 and a bottom roller 54, resulting in the generation of thinned output sheet of dough 56 which, in turn, is sent to output ramp 58. As in the prior art, output ramp 58 operates to pull dough from between the satellite head 12 and the bottom roller 54 at a rate of speed in the direction indicated by arrow 60 which is greater than the input rate of speed in the direction indicated by arrow 62. The speed of the bottom roller 54 is greater by a factor equal to the amount of thinning desired.

Also as in the prior art, satellite head 12 is rotated in the direction indicated by arrow 64 at an angular speed as much as twenty times the angular speed of bottom roller 54.

Bottom roller 54 is rotated in the direction indicated by arrow 66. For purposes of clarity of illustration, the catch plate 46 has not been illustrated in the drawing of FIG. 8.

Figure 9:
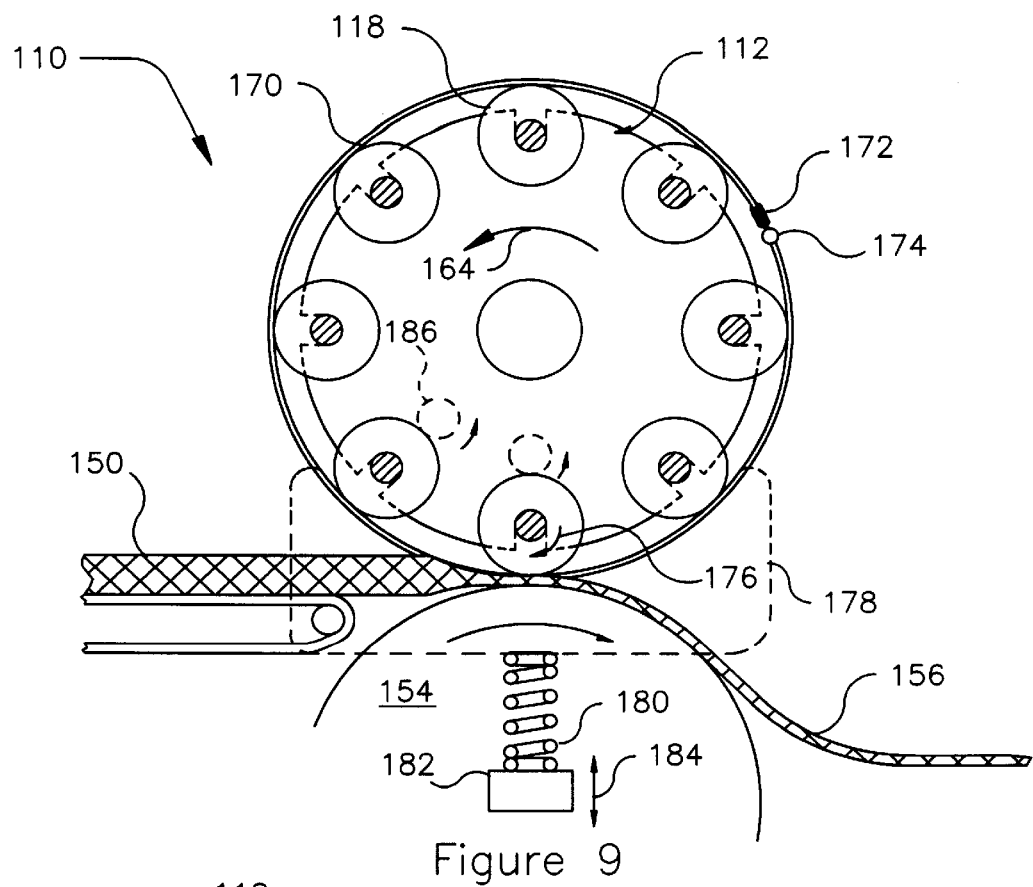
FIG. 9 is a cross sectional view in schematic form illustrating an improved form of the invention.
Figure 10:
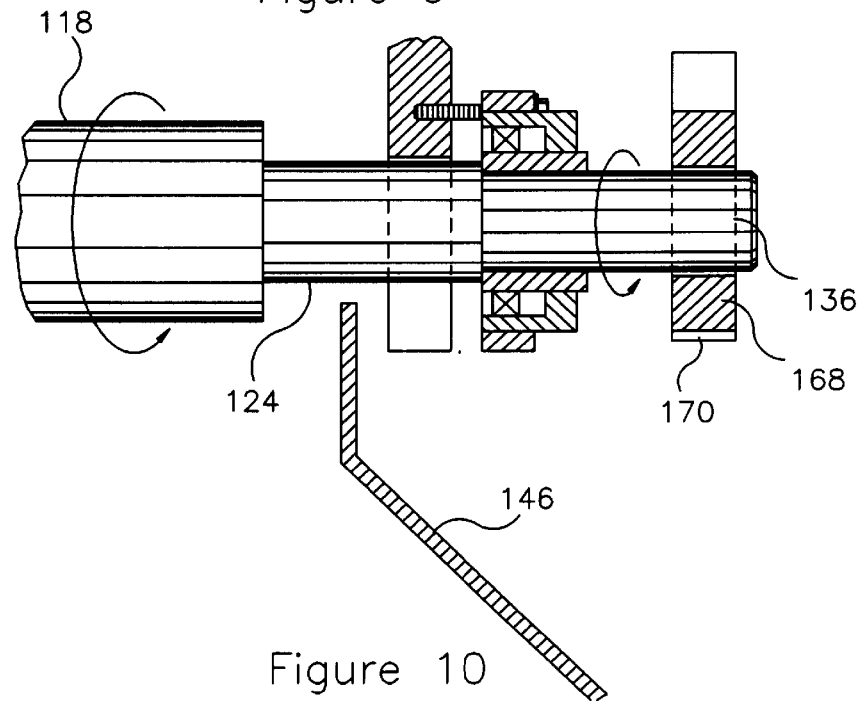
FIG. 10 is a detail of the bearing block and friction roller drive of the embodiment of FIG. 9.

Referring to FIGS. 9 and 10, with parts numbered with numbers 100 higher than analogous elements in the previous embodiment, a particularly advantageous embodiment of a dough thinning system 110 constructed in accordance with the present invention is illustrated. System 110 comprises a satellite head 112 which comprises a plurality of satellite rollers 118. Complementary pressure is provided by a bottom roller 154 to reduce an input dough sheet 150 to a reduced dough sheet 156.

In accordance with this embodiment, stresses induced by differences in the velocity of satellite rollers 118 as compared to the angular velocity of bottom roller 154 are substantially eliminated. The same is done by providing the ends 136 of posts 124 with drive disks 168. Drive disks 168 are driven by a belt 170, which extends around the satellite head and is tensioned by a spring 172 which together with the end of belt 170 opposite spring 172 is secured to a support 174. The result of such belt tensioning is to cause satellite rollers 118 to move in the direction indicated by arrows 176 when the satellite head 112 is rotated in the direction indicated by arrow 164.

An alternative method of tensioning is a rubber drive block 178 which is illustrated in dashed lines in FIG. 9. Drive block 178 has a cylindrical surface 180 which bears against drive disks 168. Proper pressure is provided by a spring 180, which bears against block 178 and a support 182. Support 182 is moved in the directions indicated by arrows 184 to vary the pressure applied by spring 180 to block 178.

Yet another alternative is the use of a system of planetary gears 186 as illustrated in phantom lines in FIG. 9.

Figure 11:
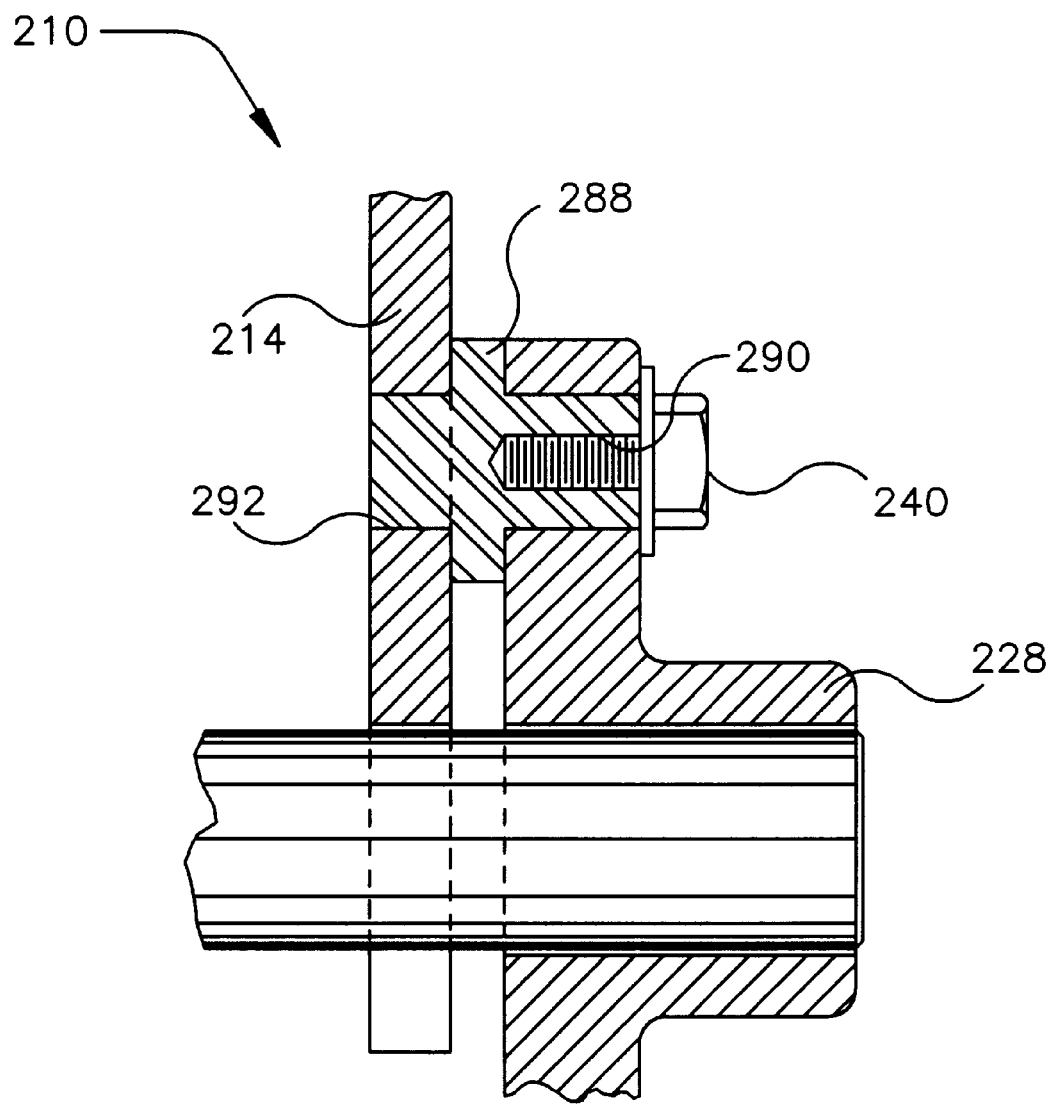
FIG. 11 is a detail of an improved embodiment of the invention With bearing block spacers which facilitate cleaning of the inventive system.

Referring to FIG. 11, yet another alternative embodiment of a system 210 constructed in accordance with the present invention is illustrated. Here system 210 comprises a bearing block 228 similar to that of the embodiment of FIGS. 9 and 10 except that the bearing block 228 is screwed to a spacer 288 which includes a tapped hole 290 for receiving bolt 240. Spacer 288 is, in turn, welded into disk 214 and the tapped hole 292 provided in disk 214 to support spacer 288.

While an illustrative embodiment of the invention has been described above, it is, of course, understood that various modifications will be apparent to those of ordinary skill in the art. Such modifications are within the spirit and scope of the invention, which is limited and defined only by the appended claims.

We claim:

1. A dough handling system, comprising:

(a) a bottom roller;

(b) a satellite head, said satellite head comprising:

(i) a plurality of hollow satellite rollers, each of said rollers having a pair of annular plates affixed at opposite ends of said rollers, each said pair of annular plates being configured to receive and support a shaft, end portions of each of said shafts extending outwardly from opposite ends of said rollers and affixed to said annular plates;

(ii) a pair of disks, said disks being positioned, configured and dimensioned to receive said end portions of said shafts; and (iii) a plurality of bearing assemblies, said bearing assemblies being mounted on said disks and rotatably supporting said end portions of said shafts;

(c) a support structure for rotatably supporting said satellite head and said bottom roller in facing spaced relationship with respect to each other and defining an area for receiving and manipulating a sheet of dough between facing surfaces of said satellite head and said bottom roller, said bearing assemblies being positioned on said disks outside said area defined between said satellite head and said bottom roller; and (e) a drive member for rotating said bottom roller and said satellite head.

2. A dough handling system, comprising:

(a) a bottom roller;

(b) a satellite head, said satellite head comprising:

(i) a plurality of satellite rollers each of said satellite rollers having a pair of ends and a central working surface;

(ii) a pair of disks mounted for rotation above said bottom roller;

(iii) a plurality of bearing assemblies mounted on said disks for supporting said ends of said satellite rollers; and (c) a pair of sheet-like canopies having upper edges positioned below said bearing assemblies, and between said disks and said bearing assemblies on one side and said working surfaces of said rollers on the other side, said canopies extending down from said upper edges and away from said working surfaces and extending under said bearing assemblies.

3. A dough handling system as in claim 1, wherein said structure further comprises a pair of shields, said shields being located at opposite ends of said satellite rollers and positioned between said disks and said bottom roller, said shields being angularly configured to deflect debris from said bearing assemblies away from said bottom roller and the surrounding area.

4. A dough handling system as in claim 1, wherein said satellite head further comprises a plurality of drive blocks, said drive blocks being affixed to said end portions of said shafts and communicating with said drive member to provide a rotational force to said drive blocks.

5. A dough handling system as in claim 1, wherein said drive member comprises:

(a) a first motor, for providing a rotational force to said bottom roller causing said bottom roller to rotate in a first direction;

(b) a second motor, for providing a rotational force to said satellite head causing said satellite head to rotate in a second direction, said second direction being substantially opposite said first direction; and (c) a drive member for rotating said satellite rollers in said first direction.

6. A dough handling system as in claim 2, wherein said bearing assemblies are drive disks, said drive disks being driven by a belt, said belt being driven by a rotating means.

7. A dough handling system as in claim 4, wherein said structure further comprises a pair of shields, said shields being located at opposite ends of said satellite rollers and positioned between said disks and said bottom roller, said shields being angularly configured to deflect debris from said bearing assemblies away from said bottom roller and the surrounding area.

\* \* \* \* \*